(12) United States Patent
Hsu (10) Patent No.: US 7,455,101 B2
(45) Date of Patent: Nov. 25, 2008

(54) DEVICE OF MICRO LOOP THERMOSYPHON FOR FERROFLUID POWER GENERATOR

(75) Inventor: Li-Chieh Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 849 days.

(21) Appl. No.: 11/041,949

(22) Filed: Jan. 26, 2005

(65) Prior Publication Data

US 2006/0110262 A1    May 25, 2006

(30) Foreign Application Priority Data

Nov. 23, 2004    (TW) ............................... 93135936 A (51) Int. Cl.
*F01K 15/00* (2006.01)
(52) U.S. Cl. .................. 165/104.33; 290/55; 290/52; 290/1 R; 165/104.29; 62/DIG. 22; 361/699
(58) Field of Classification Search .................. 290/2, 290/55, 52, 20, 1 R; 62/DIG. 22; 165/104.29, 165/104.33; 361/699
See application file for complete search history.

(56) References Cited

U.S. PATENT DOCUMENTS 4,064,409 A    12/1977    Redman ..................... 310/306
4,114,046 A *  9/1978    Yousef ......................... 290/55
4,454,427 A *  6/1984    Sosnowski et al. ............. 290/2
5,391,925 A *  2/1995    Casten et al. ................ 290/1 R
6,704,200 B2    3/2004    Zighami et al. ............. 361/700

* cited by examiner

*Primary Examiner*—Darren Schuberg
*Assistant Examiner*—Iraj A Mohandesi
(74) *Attorney, Agent, or Firm*—Troxell Law Office, PLLC (57) ABSTRACT

The present invention provides a micro loop thermosyphon cooler, having a thermal absorption unit and a condenser sequentially arranged therein, wherein the condenser is arranged at a position higher than that of the thermal absorption unit by a height. The thermal absorption unit further comprises a microchannel system formed by superimposing a cover on a substrate having a plurality of micro-grooves arranged thereon, so that the microchannel system is capable of allowing a fluid with a plurality of magnetic particles to flow in and through. In this regard the thermal absorption unit is used for absorbing thermal energy and thus enabling the fluid to vaporize and generate bubbles accordingly for elevating and driving the remaining fluid to flow into the condenser for discharging heat. Moreover, the condenser is positioned over the thermal absorption unit by a height while coupled to the outlet of the thermal absorption unit by an inlet thereof via a conduit, and coupled to an inlet of the thermal absorption unit by an outlet thereof via another conduit. In this regard, the condenser is capable of condensing the vaporized fluid and remixing the same with unvaporized fluid passing so as to enable the remixed fluid to flow back to the thermal absorption unit by the action of gravity.

30 Claims, 7 Drawing Sheets

DEVICE OF MICRO LOOP THERMOSYPHON FOR FERROFLUID POWER GENERATOR

FIELD OF THE INVENTION

The present invention relates to a micro loop thermosyphon cooler, and more particularly, to a device of micro loop thermosyphon for ferrofluid power generator, in which the magnetic particles in a ferrofluid are forced to flow therein by utilizing loop thermosyphon techniques to generate a self-pumping process.

BACKGROUND OF THE INVENTION here are many types of electrical generators, most of which convert thermal energy to fluid energy to mechanical energy to electrical energy. The principal sources of electrical power convert thermal energy generated by burning coal or gas or by atomic fission to superheated steam which is then converted to rotary mechanical power through a turbine which, in turn, drives an electro-mechanical generator.

It has also been proposed to use a closed loop ferrofluid system to drive a turbine for generation of power. In such a system, ferrofluids that undergo large changes in their magnetic properties with temperature are subjected to heating and cooling at separate points of the closed loop so that, by use of an electromagnet, a self-pumping action can be created which may be used to drive the turbine. Nevertheless, these prior art electrical generators employ a plurality of large-sized mechanically moving elements for generating electricity, that are difficult to maintain, repair, and operate quiet with little vibration. In this regard, these prior art electrical generators have limited usages especially in the apparatuses requiring high precision, which are mostly powered by battery.

In view of the above description, there are several prior-art devices dealing with the matter. Namely, a ferrofluidic electrical generator is disclosed at U.S. Pat. No. 4,064,409, entitled "FERROFLUIDIC ELECTRICAL GENERATOR" by Charles M Redman, which is an electrical generator utilizing heating and cooling of separate points in a closed circuit ferrofluid system for enabling the ferrofluid circulating in the circuit by self-pumping to experience rapid change in their magnetic properties with temperature and thus generate an induced current by virtue of the change of rate of magnetic flux, so as to achieve the object of simplifying the generation of electrical power by eliminating the mechanical stages and directly from heat energy. Nevertheless, the medium used in the referring ferrofluid generator is a ferrofluid comprising magnetite of less than 100 angstroms in diameter, whose Curie Temperature is above 550 C., such that the referring ferrofluid generator requires a very high working temperature for enabling the magnetic flux to change significantly and thus consumes a comparatively large amount of energy.

On the other hand, it is preferred to have a device capable of effectively utilizing the thermal energy, i.e. heat, dissipating therefrom for achieving objects of energy conservation, environmental protection and resource recycling.

Moreover, as the increasing of computing performance, the temperature of the microprocessor embedded inside either a desktop PC or notebook PC increases as well, where the high temperature is going to cause the reduction of efficiency of the microprocessor in consequence. In this regard, certain prior art techniques have been disclosed for cooling down the temperature of the microprocessor while keeping the same in a specific working temperature. For instance, the U.S. Pat. No. 6,704,200, entitled "LOOP THERMOSYPHON USING MICROCHANNEL ETCHED SEMICONDUCTOR DIE AS EVAPORATOR", discloses a loop thermosyphon system, comprising: a semiconductor die having a plurality of microchannels; and a condenser in fluid communication with the microchannels; and wicking structure to wick a fluid between the condenser to the semiconductor die; wherein the fluid can be selected from the group consisting of water, alcohol and Fluorienert. Nevertheless, although the referring loop thermosyphon system is capable of cooling down the temperature of a microprocessor, it did not further put the thermal energy absorbed by the loop thermosyphon system into some sort of usage, which is wasteful and can be improved.

In view of the above description, the present invention contemplates the abovementioned shortcomings and desires to come up with a device of micro loop thermosyphon for ferrofluid power generator capable overcoming those shortcomings while generating electric power.

SUMMARY OF THE INVENTION

It is the primary object of the invention to provide a device of micro loop thermosyphon for ferrofluid power generator, in which a fluid are forced to flow therein by utilizing loop thermosyphon techniques to generate a self-pumping process, thereby utilizing the buoyancy of the bubbles of vaporized fluid generated in the loop thermosyphon device and the gravity exerting on the fluid flowing therein, such that the fluid is flowing and circulating inside a closed circuit formed in the device without requiring additional energy consumption.

It is the secondary object of the invention to provide a device of micro loop thermosyphon for ferrofluid power generator, being used as a power source of a ferrofluid power system for driving a plural of magnetic particles of a ferrofluid flowing in the ferrofluid power system to flow pass a coil such that an induced current can be generated.

It is another object of the invention to provide a device of micro loop thermosyphon for ferrofluid power generator, being used as a noiseless micro loop thermosyphon cooler with no mechanically moving elements, adapted for dissipating heat generated by an electronic apparatus, that the cooler utilizes the density differences between a conduit thereof containing both liquid and vapor and another conduit thereof containing only liquid to induce a circulation so as to dissipate heat.

It is yet another object of the invention to provide a device of micro loop thermosyphon for ferrofluid power generator, being used as a ferrofluid power generator with micro loop thermosyphon that is being arranged in an electronic apparatus for recycling the thermal energy dissipating from the electronic apparatus.

Further, another object of the invention is to provide a device of micro loop thermosyphon for ferrofluid power generator, being used as a ferrofluid power generator with loop thermosyphon cooler that is capable of arranged in an electronic apparatus for cooling a CPU of the electronic apparatus and providing power to drive the circulation of an electricity-generating circuit, which can dissipate heat as well as save power consumption of the electronic apparatus.

To achieve the above objects, the present invention provides a micro loop thermosyphon cooler, having a thermal absorption unit and a condenser sequentially arranged therein, wherein the condenser is arranged at a position higher than that of the thermal absorption unit by a height. The thermal absorption unit further comprises a microchannel system formed by superimposing a cover on a substrate having a plurality of micro-grooves arranged thereon, so that the microchannel system is capable of allowing a fluid with a plurality of magnetic particles to flow in and through. In this regard the thermal absorption unit is used for absorbing thermal energy and thus enabling the fluid to vaporize and generate bubbles accordingly for pressurizing and driving the remaining fluid to flow into the condenser for discharging heat. Moreover, the condenser is positioned over the thermal absorption unit by a height while coupled to the outlet of the thermal absorption unit by an inlet thereof via a conduit, and coupled to an inlet of the thermal absorption unit by an outlet thereof via another conduit. In this regard, the condenser is capable of condensing the vaporized fluid and enable the same to mix with the unvaporized fluid so that the condensed fluid along with the unvaporized fluid can flow back to the thermal absorption unit by the action of gravity.

Moreover, the present invention further provides a ferrofluid power generator with loop thermosyphon cooler, having a heat source, a thermal absorption unit, a condenser, and a ferrofluid power generator sequentially arranged therein. The thermal absorption unit having a plurality of micro-grooves arranged therein is coupled to the heat source enabling the fluid within each micro-groove to absorb heat from the heat source and thus partially vaporized. Thereafter, bubbles generated by the vaporized fluid pressure the unvaporized fluid to force a plurality of magnetic particles in the fluid to flow and enter the ferrofluid power generator such that an induced current is generated by the change of rate of magnetic flux. In addition, the vaporized fluid enters the condenser and is liquefied, where the liquefied fluid is guided to flow back to the thermal absorption unit by the action of gravity so as to complete a self-pumping process.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1A:
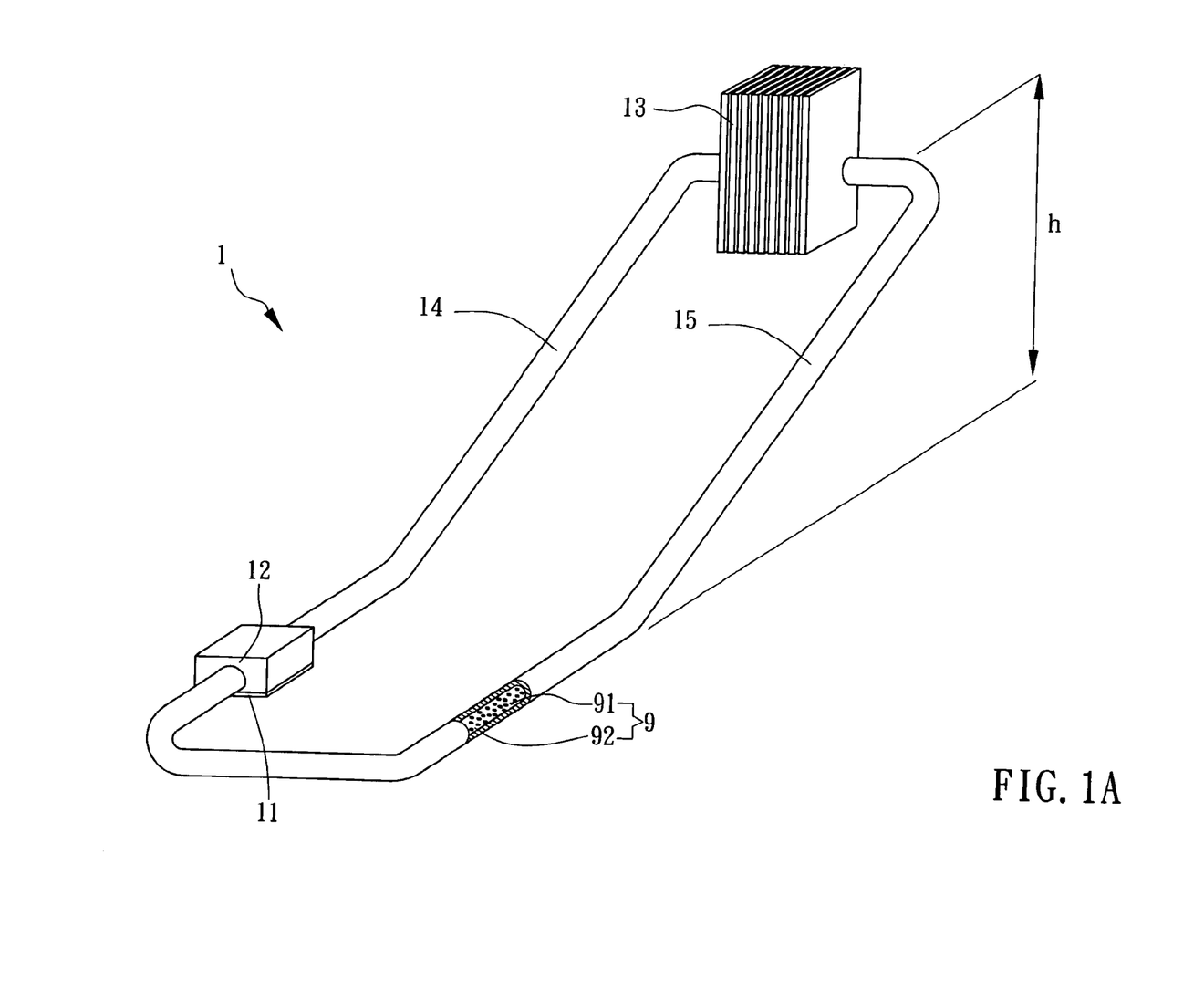
FIG. 1A is a schematic illustration showing a device of micro loop thermosyphon for ferrofluid power generator according to a preferred embodiment of the invention.

Please refer to FIG. 1A, which is a schematic illustration showing a device of micro loop thermosyphon for ferrofluid power generator according to a preferred embodiment of the invention. The device of micro loop thermosyphon for ferrofluid power generator 1 of FIG. 1A, being used as a micro loop thermosyphon cooler, employs a ferrofluid 9 composed of a plurality of magnetic particles 91 and a fluid 92 as working fluid, wherein the magnetic particle 91 can be a magnetized nano-scale dipole iron particle or other nano-scale dipole particle, and the fluid 92 can be a non-electrolysis chemical coolant like a fluoride liquid with low boiling point, which can be selected from the group consisting of FC-87, PF-5052, FC-72 and the mixture thereof. The device of micro loop thermosyphon for ferrofluid power generator 1 comprises: a heat source 11; a thermal absorption unit 12, coupled to the heat source 11; and a condenser 13, arranged at a position higher than that of the thermal absorption unit 12 by a height while coupled to the outlet of the thermal absorption unit 12 by an inlet thereof via a conduit capable of containing both liquid and vapor, and coupled to an inlet of the thermal absorption unit 12 by an outlet thereof via another conduit capable of containing only liquid. The heat source 11 can be a heat-generating electronic device, such as a central processing unit of a notebook computer, another chips of the notebook compute or heat pipe, etc.

Figure 2A:
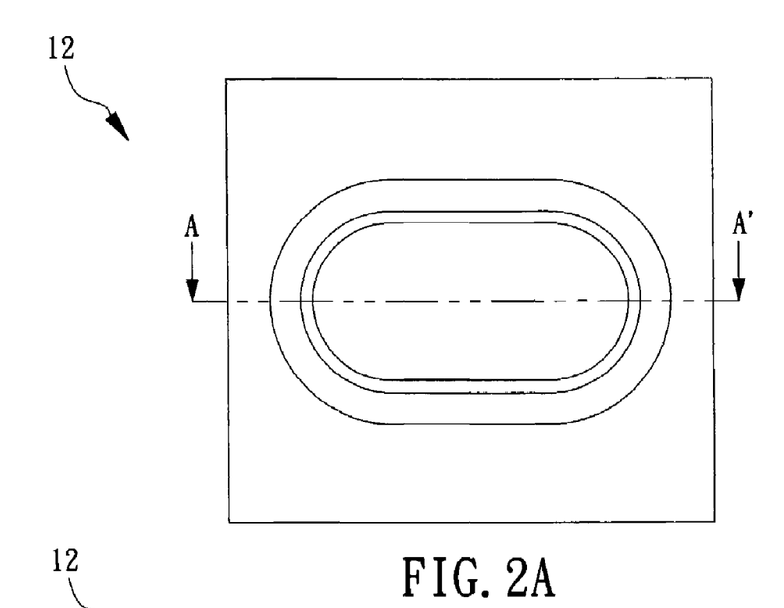
FIG. 2A is a top view of the thermal absorption unit of the present invention.
Figure 2B:
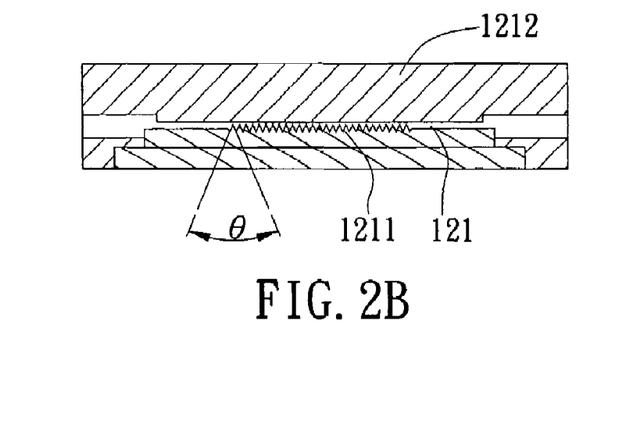
FIG. 2B is an A-A sectional view of the thermal absorption unit of the present invention.
Figure 4A:
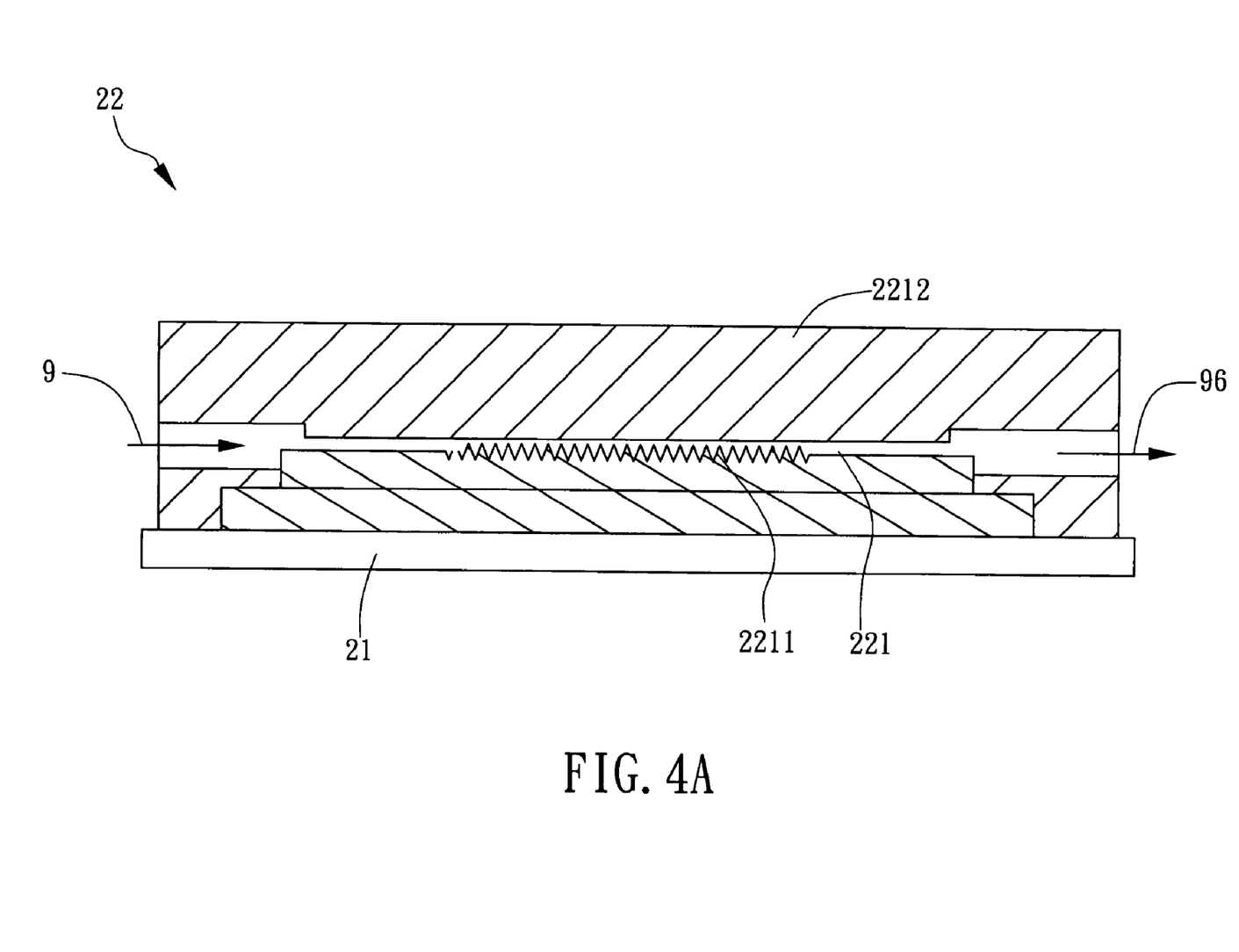
FIG. 4A is a schematic representation depicting a thermal absorption unit having fluid flowing therein according to the present invention.
Figure 4B:
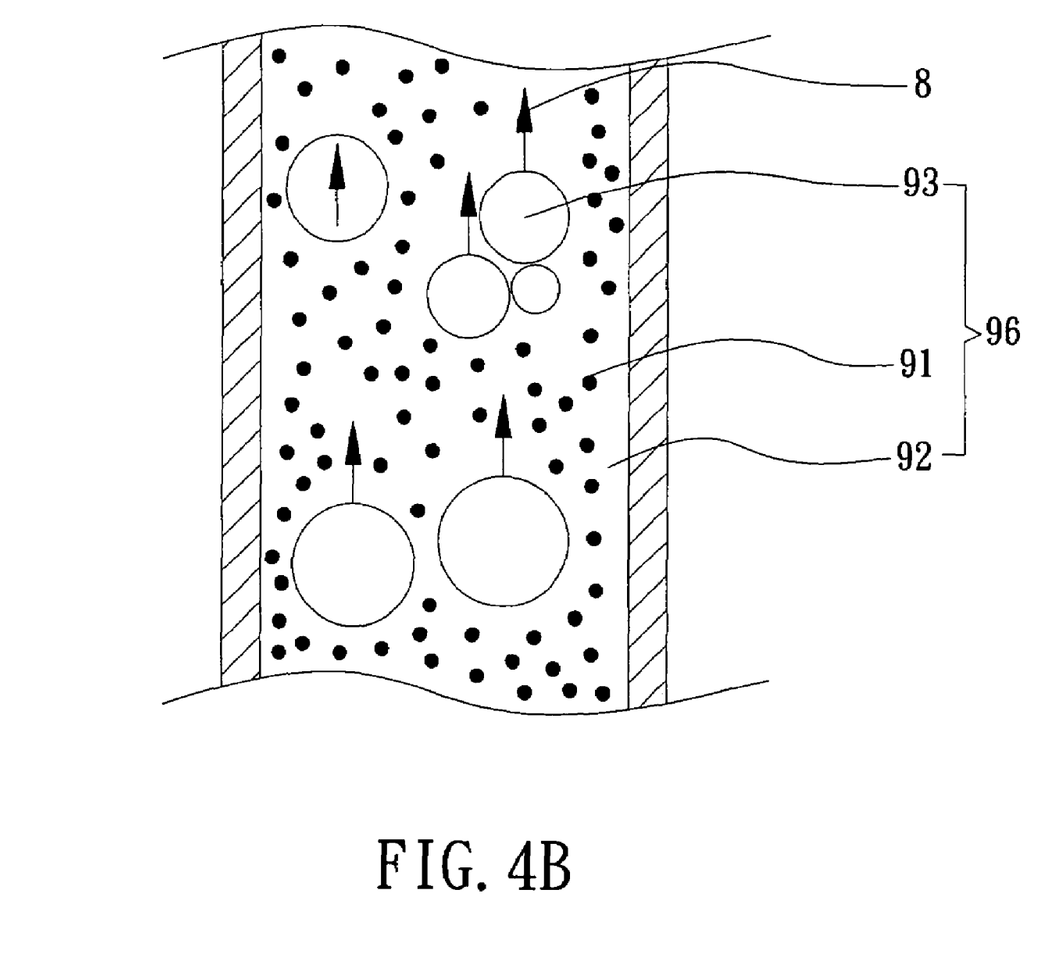
FIG. 4B is a schematic illustration depicting a plurality of magnetic particles being pressurized by bubbles according to the present invention.

Please refer to FIG. 2A and FIG. 2B, which are respectively a top view and an A-A sectional view of the thermal absorption unit of the present invention. The thermal absorption unit 12 comprises a microchannel system 121 formed by superimposing a cover 1212 on a substrate having a plurality of micro-grooves 1211 arranged thereon, wherein the sectional contour of said each micro-groove is defined by a function selected from the group consisting of a triangular wave function and a square wave function. As seen in FIG. 2B, the disposition of the micro-grooves on the surface of the substrate forms a serrated structure with triangular sawteeth having an included angle θ of 60 degree. The microchannel system 121 formed by superimposing the cover 1212 on the plural micro-grooves 1211 is capable of allowing the ferrofluid 9 to flow through, wherein the disposition of the plural micro-grooves can increase the area of the microchannel system 121 contacting with the ferrofluid 9 for increasing the effect of thermal conducting. Please refer to FIG. 4A, which is a schematic representation depicting a thermal absorption unit having fluid flowing therein according to the present invention. As the ferrofluid 9 flows into the microchannel system 221 and contacts the plural micro-grooves 2211, a portion of the ferrofluid 9 will be vaporized by the thermal energy absorbed by the same which is remixed with the remaining unvaporized ferrofluid 9 and forms a mixed ferrofluid 96 containing both the gaseous state and liquid state of the same. In the present embodiment of the invention, the extending direction of the micro-groove 2211 is perpendicular to the flowing direction of the ferrofluid 9. To further illustrate the actions happened in the mixing ferrofluid 96, it is refer to FIG. 4B for a schematic illustration depicting a plurality of magnetic particles being pressurized and driven by bubbles. As seen in FIG. 4B, a plurality of bubbles 93 generated in the mixing ferrofluid 96 will force the fluid 92 to flow and driving the plural magnetic particles 91 to flow therewith. Thereafter, as seen in FIG. 1A, the bubbles formed by vaporized ferrofluid enters the condenser 13, in which the vaporized ferrofluid is condensed and liquefied to become the fluid 92 by discharging heat, and the liquefied ferrofluid 9 is guided to flow back to the thermal absorption unit 12 by the action of gravity since the condenser is arranged at a position higher than that of the thermal absorption unit by a specific height h. In this regard, a self-pumping process can be complete by utilizing the density differences between a conduit 14 containing both liquid and vapor and another conduit 15 containing only liquid to induce a circulation.

Figure 1B:
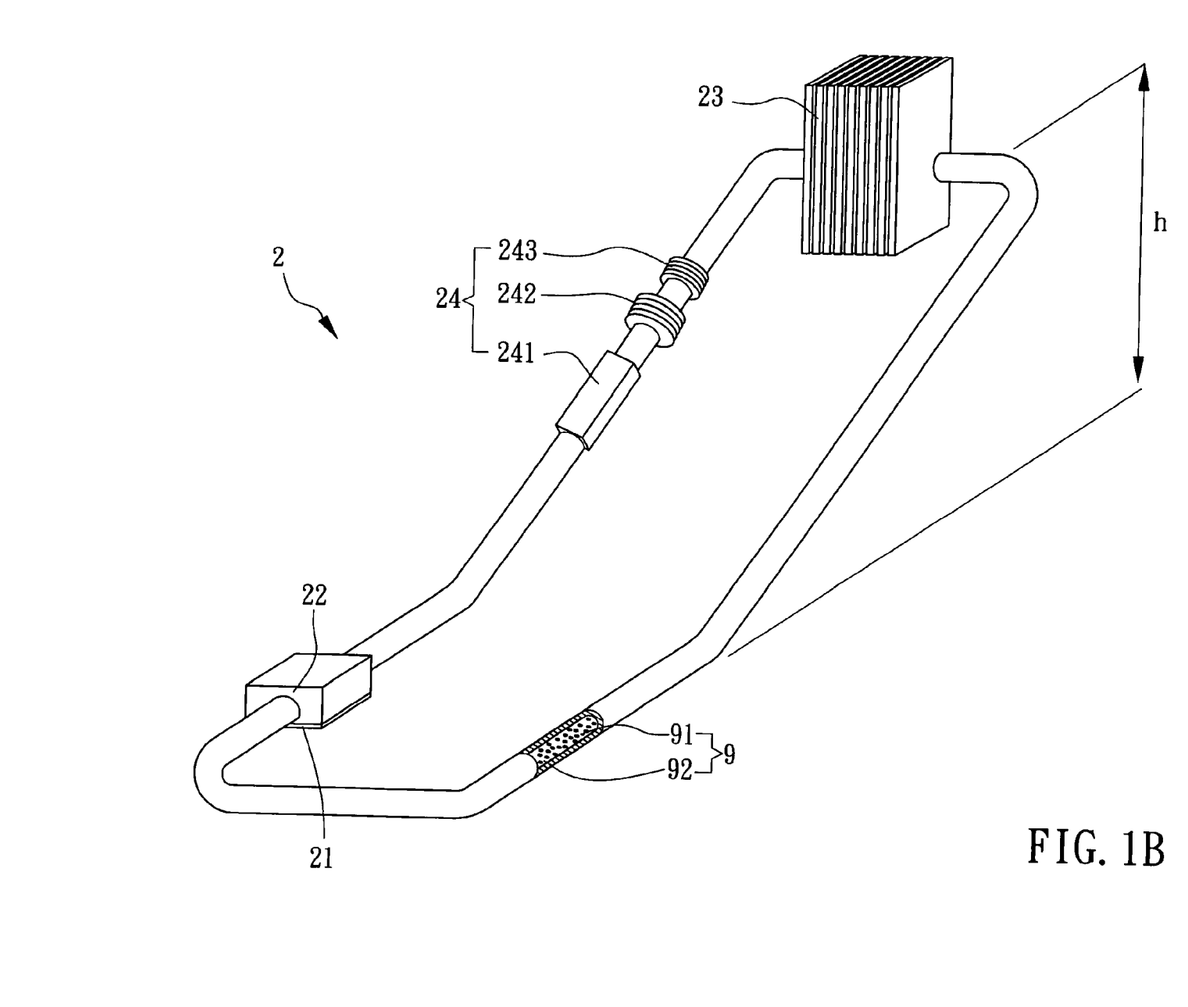
FIG. 1B is a schematic illustration showing a device of micro loop thermosyphon for ferrofluid power generator according to another preferred embodiment of the invention.

Please refer to FIG. 1B, which is a schematic illustration showing a device of micro loop thermosyphon for ferrofluid power generator according to another preferred embodiment of the invention. The device of micro loop thermosyphon for ferrofluid power generator 2, being used as a ferrofluid power generator with micro loop thermosyphon, capable of generating an induced current by enabling a ferrofluid 9 composed of a plurality of magnetic particles 91 and a fluid 92 to flow therethrough, wherein the magnetic particle 91 can be a magnetized nano-scale dipole iron particle or other nano-scale dipole particle, and the fluid 92 can be a non-electrolysis chemical coolant like a fluoride liquid with low boiling point, which can be selected from the group consisting of FC-87, PF-5052, FC-72 and the mixture thereof. The device of micro loop thermosyphon for ferrofluid power generator 2 comprises: a heat source 21; a thermal absorption unit 22, coupled to the heat source 21; a condenser 23, arranged at a position higher than that of the thermal absorption unit 12 by a height h while coupled to the outlet of the thermal absorption unit 22 by an inlet thereof; and a ferrofluid power generator 24. The heat source 21 can be a heat-generating electronic device, such as a central processing unit of a notebook computer, another chips of the notebook computer and thermal tube, etc. The structure of the thermal absorption unit 22 is similar to that seen in FIG. 2B and is not described further hereinafter.

Figure 3A:
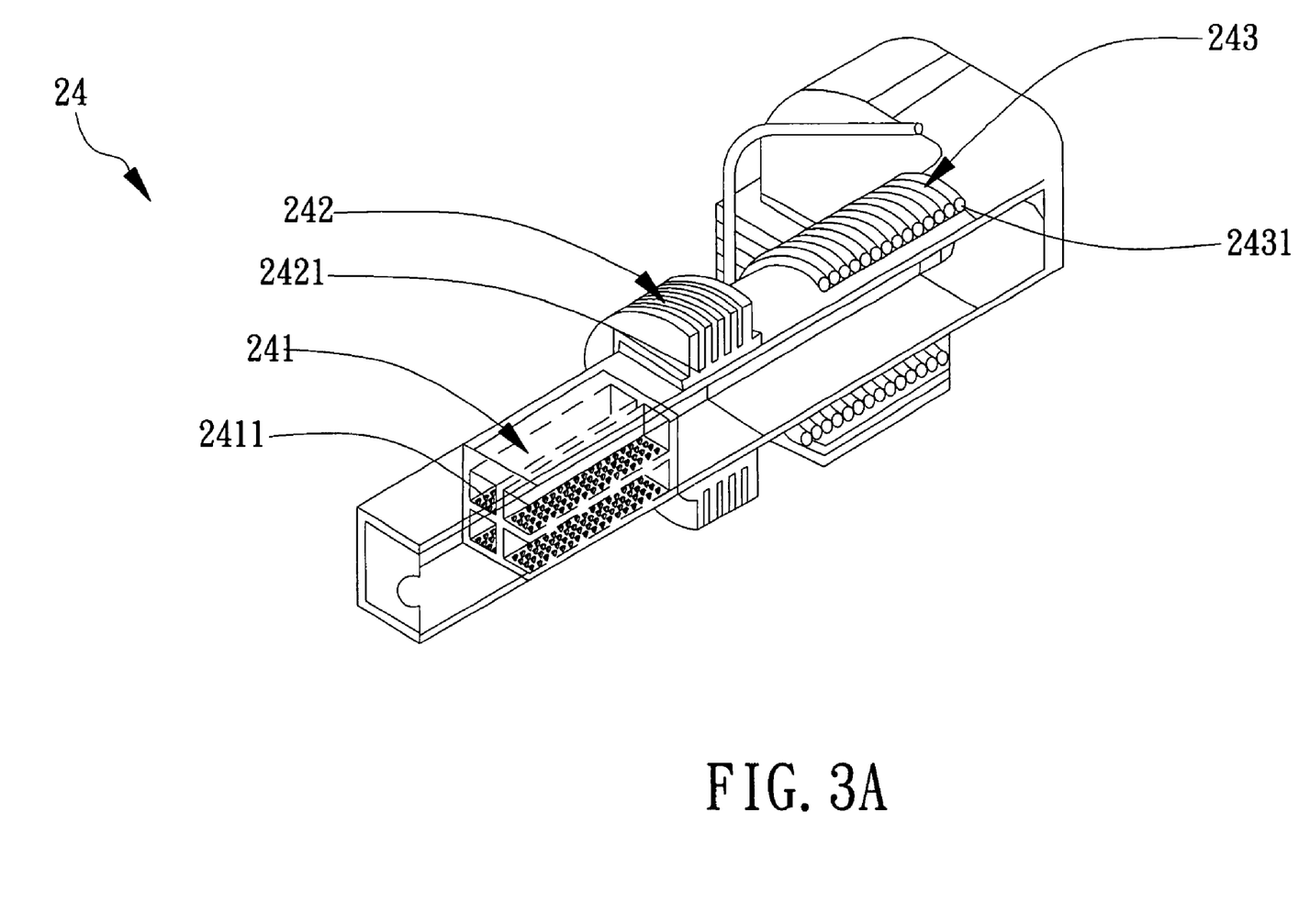
FIG. 3A is a three-dimensional representation showing a ferrofluid power generator of the device according to the present invention.

Please refer to FIG. 3A, which is a three-dimensional representation showing a ferrofluid power generator of the device according to the present invention. The ferrofluid power generator 24, being substantially a tube, comprises a vortex generator 241, a magnetic matrix filed array 242 and an induced current unit 243, being sequentially arranged. Moreover, the vortex generator 241 further comprises a plurality of cavities 2411 arranged therein; and the induced current unit 33 further comprises a micro-scale copper coil 2431 wrapping around the outer rim of the tube, capable of generating an induced current thereon while sensing the change of magnetic flux as a ferrofluid 9 composed of a plurality of magnetic particles 91 and a fluid 92 is flowing therethrough; and the magnetic field array 242 further comprises a permanent magnetic 2421 disposed surrounding the outer rim of the tube for providing an evenly distributed magnetic filed so as to enable the plural magnetic particles 91 to rotate in synchronization by eliminating the phase angle differences of different magnetic particles 91.

Figure 3B:
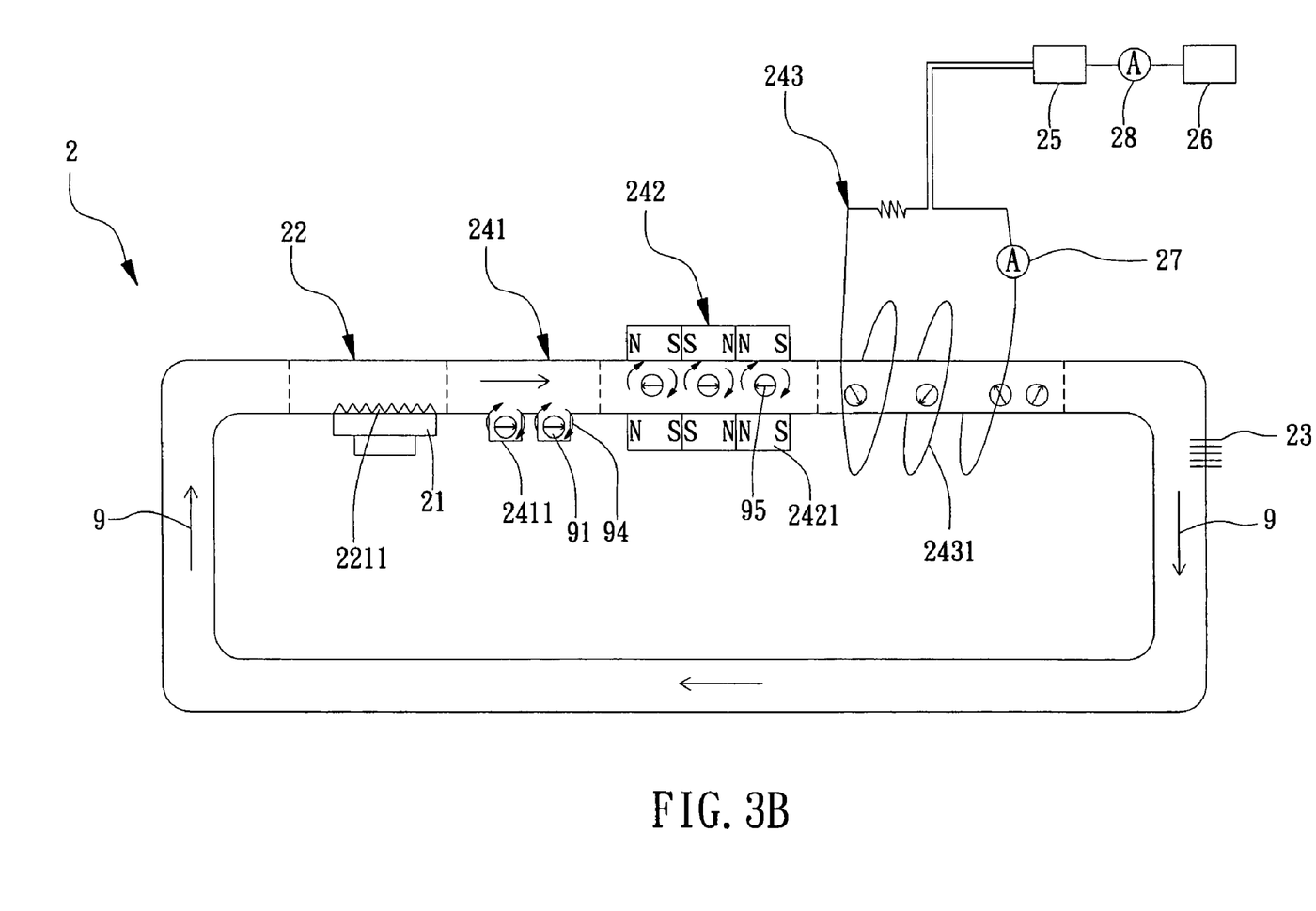
FIG. 3B is a schematic illustration showing the circulation in the device of micro loop thermosyphon for ferrofluid power generator according to a preferred embodiment of the present invention.

Please refer to FIG. 3B, is a schematic illustration showing the circulation in the device of micro loop thermosyphon for ferrofluid power generator according to a preferred embodiment of the present invention. As seen in FIG. 3B, as the ferrofluid 9 is flowing through the thermal absorption unit 22, the thermal energy of the thermal absorption unit 22 received from the heat source 21 will be absorbed by the ferrofluid 9 such that a plurality of micro-grooves 2211 are arranged in the thermal absorption unit 22 for increasing the area of the thermal absorption unit 22 contacting with the ferrofluid 9 and thus increasing the heat flux therebetween. By virtue of this, a portion of the ferrofluid 9 will be vaporized by the thermal energy which is remixed with the remaining unvaporized ferrofluid 9 and forms a mixed ferrofluid 96 containing both the gaseous state and liquid state of the same as seen in FIG. 4B, and thereafter, a plurality of bubbles 93 generated in the mixing ferrofluid 96 will force the fluid 92 to flow upward to an upper end of the thermal absorption unit 22 and driving the plural magnetic particles 91 to flow therewith. As seen in FIG. 3B, the buoyancy of the bubble 93 drives the same to move upward by a small angle of elevation following a specific direction defined by the thermal absorption unit 22 while pressurizing the ferrofluid 9 to flow toward the vortex generator 241. Moreover, a plurality of cavities 2411 is disposed in the vortex generator 241, and the sectional contour of the cavity 2411 is defined by a function, which can be selected from the group consisting of a triangle wave function and a square wave function, but is not limited by the same. Hence, each magnetic particles 91 is enabled to spin as the one 94 seen in FIG. 3B due to the fluid 92 flowing around the same have different velocities caused by vortex while the magnetic particle 91 is flowing passing the cavity 2411, such that the rotating velocity of the magnetic particle 91 is increased. Thereafter, the rotating magnetic particles are driven to flow through the magnetic field array 242, where a permanent magnetic field is arranged surrounding the outer rim of the magnetic field array 242 for aligning the magnetic particles 91 to have a coincident polar direction 95 so as to prevent the magnetic fields of the plural magnetic particles 91 from counteracting each other while enabling the magnetic particles to rotate in synchronization by eliminating the phase differences of different magnetic particles 91, such that the change of rate of magnetic flux is increase while the magnetic particles 91 enters the induced current unit 243.

As the ferrofluid 9 with stably rotating magnetic particles 91 flows passing the induced current unit 243, an induced current 27 is generated on the induced current unit 243 with respect to the change of magnetic flux caused by the changes of the magnetic particles 91 in velocity, magnetic field, and rotating angle. Moreover, the generated induced current 27, which is a high-frequency alternating current, is converted into a direct current 28 while passing a rectifier 25 and is being fed into the actuator 26, such that the actuator 26 can execute all sorts of functions at will.

The ferrofluid 9 containing the plural bubbles 93 is fed into the condenser 23 after the same had flow pass the induced current unit 243, where the heat dissipating capability of the condenser 23 will liquefy the vaporized ferrofluid in to liquid ferrofluid while discharging the latent heat contained in the vaporized ferrofluid, and thus the ferrofluid in liquid state can be guided to flow back to the thermal absorption unit 22 by the action of gravity. To increase the effect of condensation, a heat dissipating device is mounted on a conduit connecting the condenser 23 and the thermal absorption unit 22 for increasing the heat dissipation efficiency. In view of the above description, a self-pumping process is complete with requiring a pump to provide power for causing a circulation. In this regard, such device of the invention is especially suitable to be applied in miniature electronic devices or in micromechanical devices.

In addition, since each micro-groove of the serrated micro-channel system formed by the plural micro-grooves is capable of increasing the rate of heat flux, the heat dissipation rate of the device according to the present invention is greatly enhanced. Take a device using FC-72 as working fluid for example, the rate of heat flux can be increase from 20 W/cm$^2$ to 105 W/cm$^2$.

In summation of the description above, the present invention has the easy-to-operate, a simple manufacturing and easy-to-assemble features, and thus can meet with the requirements of the industry and enhances the competitiveness of the industry. The present invention herein enhances the performance than the conventional structure and further complies with the patent application requirements and is submitted to the Patent and Trademark Office for review and granting of the commensurate patent rights.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A micro loop thermosyphon cooler, comprising:
   a heat source;
   a thermal absorption unit, coupled to the heat source, further comprising a microchannel system formed by superimposing a cover on a substrate having a plurality of micro-grooves arranged thereon, the microchannel system being capable of allowing a ferrofluid composed of a fluid and a plurality of magnetic particles to flow through; and
   a condenser, arranged at a position higher than that of the thermal absorption unit by a height while coupled to the outlet of the thermal absorption unit by an inlet thereof via a conduit capable of containing both liquid and vapor, and coupled to an inlet of the thermal absorption unit by an outlet thereof via another conduit capable of containing only liquid;
   wherein, the thermal absorption unit absorbs the heat generated from the heat source and thus enables a portion of the fluid to vaporize and generate bubbles accordingly for pressuring the fluid to force a plurality of magnetic particles in the fluid to flow and enter the condenser so as to complete a self-pumping process while condensing the vaporized fluid and thus guiding the condensed fluid to flow back to the thermal absorption unit by the action of gravity.

2. The cooler of claim 1, wherein the sectional contour of said each micro-groove is defined by a function.

3. The cooler of claim 1, wherein the contour is defined by a function selected from the group consisting of a triangular wave function and a square wave function.

4. The cooler of claim 3, wherein an angle of the triangular wave function is 60 degree.

5. The cooler of claim 1, wherein the fluid is a mixture containing a liquid of low boiling point.

6. The cooler of claim 5, wherein the liquid of low boiling point is a non-electrolysis chemical coolant.

7. The cooler of claim 6, wherein the non-electrolysis chemical coolant is a fluoride liquid.

8. The cooler of claim 7, wherein the fluoride liquid is a liquid selected from the group consisting of FC-87, PF-5052, FC-72 and the mixtures thereof.

9. The cooler of claim 5, wherein the mixture further contains water.

10. The cooler of claim 1, wherein the heat source is a device selected from the group consisting of a central processing unit of a notebook computer and another chips of the notebook computer and the likes.

11. The cooler of claim 1, wherein the magnetic particle is a nano-scale iron particle.

12. A device of micro loop thermosyphon for ferrofluid power generator, comprising:
   a heat source;
   a thermal absorption unit, coupled to the heat source, further comprising a microchannel system formed by superimposing a cover on a substrate having a plurality of micro-grooves arranged thereon, the microchannel system being capable of allowing a ferrofluid composed of a fluid and a plurality of magnetic particles to flow through;
   a condenser, arranged at a position higher than that of the thermal absorption unit by a height while coupled to an inlet of the thermal absorption unit by an outlet thereof;
   a ferrofluid power generator being positioned between the thermal absorption unit and the condenser while coupled to the inlet of the thermal absorption unit by an inlet thereof and coupled to an inlet of the condenser by an outlet thereof, further having a induced current unit arranged therein for generating an induced current while sensing the change of rate of magnetic flux;
   wherein, the thermal absorption unit absorbs the heat generated from the heat source and thus enables a portion of the fluid to vaporize and generate bubbles accordingly for pressuring the fluid to force a plurality of magnetic particles in the fluid to flow and enter the induced current unit to generate the induced current and thereafter enter the condenser so as to complete a self-pumping process while condensing the vaporized fluid and thus guiding the condensed fluid to flow back to the thermal absorption unit by the action of gravity.

13. The device of claim 12, wherein the sectional contour of said each micro-groove is defined by a function.

14. The device of claim 12, wherein the contour is defined by a function selected from the group consisting of a triangular wave function and a square wave function.

15. The device of claim 14, wherein an angle of the triangular wave function is 60 degree.

16. The device of claim 12, wherein the fluid is a mixture containing a liquid of low boiling point.

17. The device of claim 16, wherein the liquid of low boiling point is a non-electrolysis chemical coolant.

18. The device of claim 17, wherein the non-electrolysis chemical coolant is a fluoride liquid.

19. The device of claim 18, wherein the fluoride liquid is a liquid selected from the group consisting of FC-87, PF-5052, FC-72 and the mixtures thereof.

20. The device of claim 16, wherein the mixture further contains water.

21. The device of claim 12, wherein the heat source is a device selected from the group consisting of a central processing unit of a notebook computer and another chips of the notebook computer.

22. The device of claim 12, wherein a heat dissipating device is mounted on a conduit connecting the condenser and the thermal absorption unit for increasing the heat dissipation efficiency of the device.

23. The device of claim 22, wherein the heat dissipating device is composed of a plurality of horizontal-arranged fins.

24. The device of claim 12, wherein ferrofluid power generator further comprises a vortex generator and a magnetic field array coupled to the induced current unit, being arranged in sequence.

25. The device of claim 24, wherein vortex generator is used for enabling the plural magnetic particles to spin and thus increasing the velocity of the same while passing through the induced current unit.

26. The device of claim 25, wherein a plurality of cavity is arranged inside the vortex generator for enabling vortices to be generated in the fluid and thus enabling the plural magnetic particles to spin by virtue of the vortices.

27. The device of claim 24, wherein the magnetic field array is capable of forming a magnetic field for enabling the magnetic particles to rotate in synchronization by eliminating the phase differences of different magnetic particles and thus increasing the change of rate of magnetic flux while the magnetic particles enters the induced current unit.

28. The device of claim 27, wherein the magnetic field is formed by a permanent magnet array, capable of aligning the magnetic particles to have a coincident polar direction so as to prevent the magnetic fields of the plural magnetic particles from counteracting each other.

29. The device of claim 12, wherein the induced current is converted into a direct current by a rectifier.

30. The device of claim 12, wherein the magnetic particle is a nano-scale iron particle.

* * * * *